(12) United States Patent
Pecchioli et al.

(10) Patent No.: US 7,874,790 B2
(45) Date of Patent: Jan. 25, 2011

(54) CONVEX SEALING BOTTOM FOR A TWIN-SHAFT TURBINE

(75) Inventors: Mario Pecchioli, Prato (IT); Dino Bianchi, Florence (IT)

(73) Assignee: Nuovo Pignone, S.p.A., Florence (IT)

( * ) Notice: Subject to any disclaimer, the term of this patent is extended or adjusted under 35 U.S.C. 154(b) by 983 days.

(21) Appl. No.: 11/575,426

(22) PCT Filed: Sep. 14, 2005

(86) PCT No.: PCT/EP2005/009996

§ 371 (c)(1),
(2), (4) Date: Mar. 16, 2007

(87) PCT Pub. No.: WO2006/029888

PCT Pub. Date: Mar. 23, 2006

(65) Prior Publication Data

US 2007/0257440 A1  Nov. 8, 2007

(30) Foreign Application Priority Data

Sep. 17, 2004  (IT) .......................... MI2004A1778

(51) Int. Cl.
*F04D 29/40* (2006.01)
(52) U.S. Cl. ....................... 415/115; 415/128
(58) Field of Classification Search .................. 415/68, 415/115, 124, 128, 199.5
See application file for complete search history.

(56) References Cited

U.S. PATENT DOCUMENTS

| 5,307,622 | A * | 5/1994 | Ciokajlo et al. ........... 60/39.162 |
| 6,619,030 | B1 * | 9/2003 | Seda et al. ................. 60/226.1 |
| 6,684,626 | B1 * | 2/2004 | Orlando et al. ............... 60/268 |
| 6,893,209 | B2 * | 5/2005 | Frosini et al. ............... 415/115 |
| 2004/0037699 | A1 | 2/2004 | Frosini et al. |

FOREIGN PATENT DOCUMENTS

| EP | 1 318 275 A | 6/2003 |
| EP | 1 359 364 A | 11/2003 |

* cited by examiner

*Primary Examiner*—Edward Look
*Assistant Examiner*—Sean J Younger
(74) *Attorney, Agent, or Firm*—Global Patent Operation; Mark A. Conklin

(57) ABSTRACT

Convex sealing bottom (10) for a twin-shaft turbine of the type comprising a series of convex disks constrained to each other by means of a series of pins, each disk of said disks comprises an outer shaped edge which is engaged with a corresponding annular surface (71) of an inner grooved surface (72) of a ring (70) for obtaining an axial seal.

The series of disks comprises three disks, a first disk (12), a second disk (13) and a third disk (14) respectively.

The three disks are fixed to each other centrally by means of a series of spokes (30) and are constrained in pairs respectively by means of a series of pins which are arranged orthogonally to the three disks to minimize the relative movements of the three disks in an axial direction at the same time allowing the radial dilatations of the three disks themselves.

13 Claims, 2 Drawing Sheets

CONVEX SEALING BOTTOM FOR A TWIN-SHAFT TURBINE

The present invention relates to a convex sealing bottom for a twin-shaft gas turbine.

A gas turbine is a rotating thermal machine which converts the enthalpy of a gas into useful work, using gases coming from a combustion and which supplies mechanical power on a rotating shaft.

The turbine therefore normally comprises a compressor or turbo-compressor, inside which the air taken from the outside is brought under pressure.

Various injectors feed the fuel which is mixed with the air to form a air-fuel ignition mixture.

The axial compressor is entrained by a so-called turbine, or turbo-expander, which supplies mechanical energy to a user transforming the enthalpy of the gases combusted in the combustion chamber.

In applications for the generation of mechanical energy, the expansion jump is subdivided into two partial jumps, each of which takes place inside a turbine. The high-pressure turbine, downstream of the combustion chamber, entrains the compression. The low-pressure turbine, which collects the gases coming from the high-pressure turbine, is then connected to a user.

The turbo-expander, turbo-compressor, combustion chamber (or heater), outlet shaft, regulation system and ignition system, form the essential parts of a gas turbine plant.

As far as the functioning of a gas turbine is concerned, it is known that the fluid penetrates the compressor through a series of inlet ducts.

In these canalizations, the gas has low-pressure and low-temperature characteristics, whereas, as it passes through the compressor, the gas is compressed and its temperature increases.

It then penetrates into the combustion (or heating) chamber, where it undergoes a further significant increase in temperature.

The heat necessary for the temperature increase of the gas is supplied by the combustion of gas fuel introduced into the heating chamber, by means of injectors.

The triggering of the combustion, when the machine is activated, is obtained by means of sparking plugs.

At the outlet of the combustion chamber, the high-pressure and high-temperature gas reaches the turbine, through specific ducts, where it gives up part of the energy accumulated in the compressor and heating chamber (combustor) and then flows outside by means of the discharge channels.

In applications for the generation of mechanical energy, the internal area of the high pressure turbine and the internal area of the low pressure turbine are separated by means of a bottom whose function is to guarantee a sealing between each other.

This is to avoid the drawing of gases which would jeopardize the reliability and performances of the power turbine.

The bottom also acts as a duct for a flow of so-called "purge" air, i.e. a flow of pressurized air which prevents the ingestion of hot gases through the duct towards the bottom and towards the components of the turbine which would be damaged by these hot gases.

The convex bottom currently comprises two convex disks constrained to each other by means of a series of pins.

These disks have an outer shaped edge which are coupled, forming a seal, of the metal on metal type, with a sealing ring.

Furthermore, said two disks define a channel for the purge air towards the low pressure turbine.

One of the disadvantages of the bottoms of known turbines is that, as a result of thermal gradients, they undergo deformations which cause seal losses in the areas where the seal is obtained by means of specific geometries.

The reason for this is that when the turbine is running, the pins, initially axially oriented, rotate specifically as a result of non-uniform thermal deformations on the disks, jeopardizing the correct seal on the sealing ring.

A further disadvantage is that, in this way, there is the ingestion of hot gases which jeopardize the useful life of the bottom and other components of the gas turbine.

This is because oxidation phenomena are created at hot temperatures which, accompanied by fatigue phenomena, intensify the stress causing, with time, cracks and splitting, finally jeopardizing the correct functioning of the bottom and other components.

An objective of the present invention is to provide a bottom for a twin-shaft turbine which maintains a seal without causing mechanical stress on the bottom itself.

A further objective is to provide a convex sealing bottom for a twin-shaft turbine which allows an increase in the performances of the turbine itself, maintaining a high useful life of the bottom itself.

Yet another objective is to provide a convex sealing bottom for a twin-shaft turbine which avoids the ingestion of hot gases coming both from a low pressure turbine and a high pressure turbine.

An additional objective is to provide a convex sealing bottom for a twin-shaft turbine which is simple and economical.

These objectives according to the present invention are achieved by providing a convex sealing bottom for a twin-shaft turbine as specified in claim 1.

Further characteristics of the invention are indicated in the subsequent claims.

The characteristics and advantages of a convex sealing bottom for a twin-shaft gas turbine according to the present invention will appear more evident from the following illustrative and non-limiting description, referring to the schematic drawings enclosed, in which.

Figure 1:
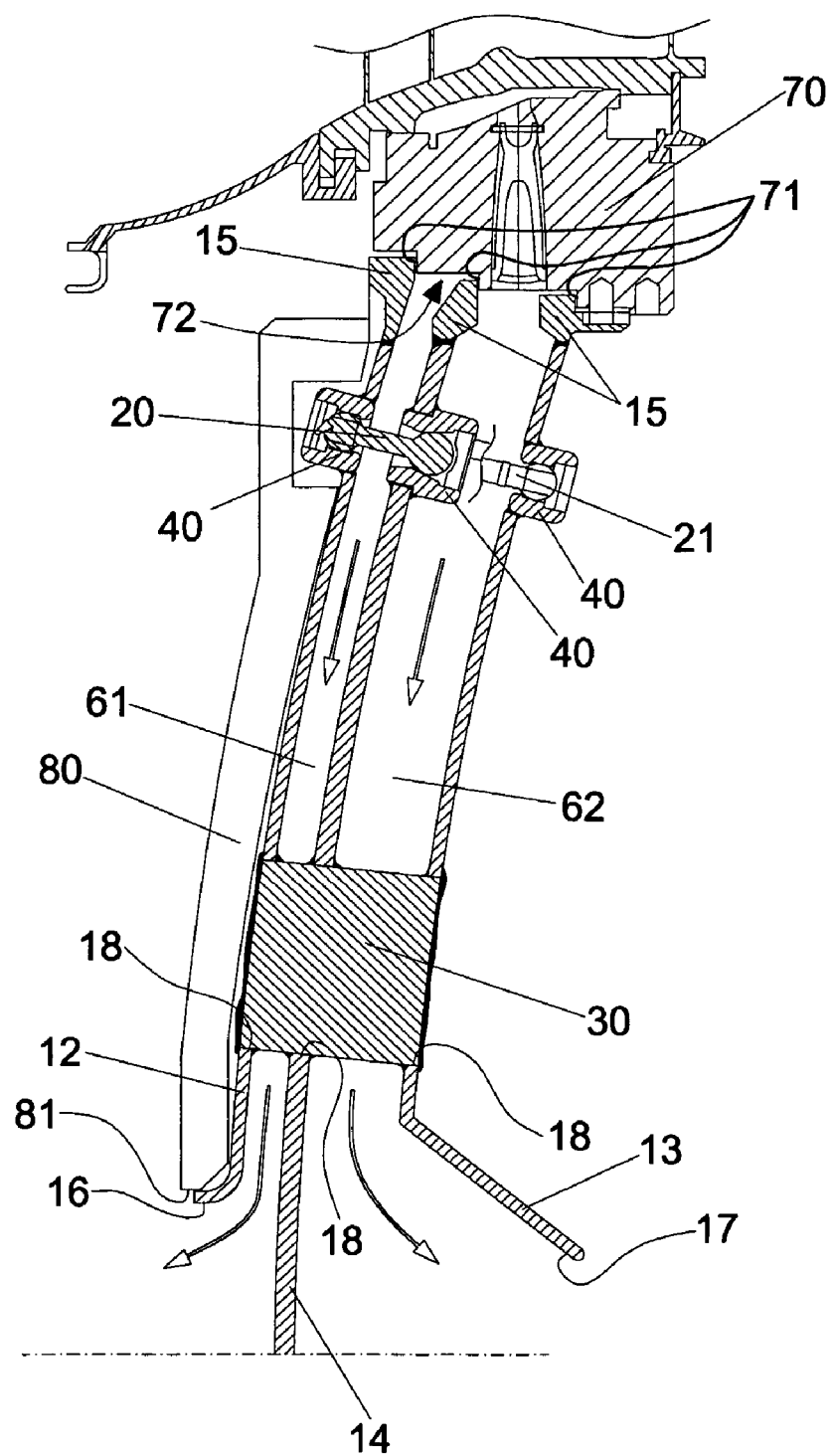
FIG. 1 is a raised sectional side view of a preferred embodiment of a bottom of a twin-shaft turbine according to the present invention.
Figure 2:
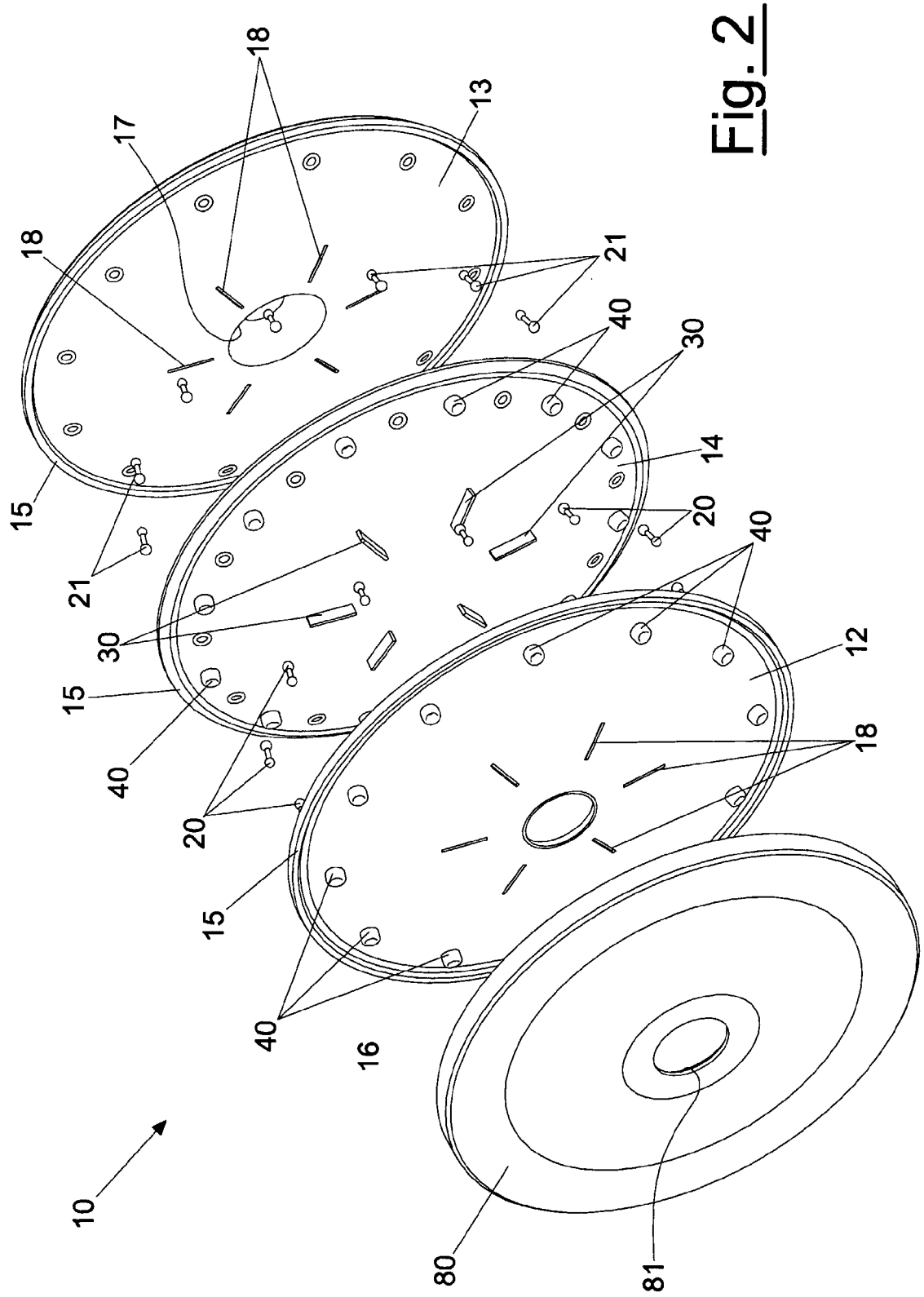
FIG. 2 is an exploded raised perspective right side view of the bottom of FIG. 1.

With reference to the figures, these show a convex sealing bottom 10 for a twin-shaft turbine having a high pressure turbine and a low pressure turbine, said bottom 10 comprises a series of disks, in particular three convex disks constrained to and distanced from each other by means of a series of pins arranged in series orthogonally to a base surface of each disks of said three disks.

Each pin of said series of pins respectively constrains two disks of said series of disks and is arranged orthogonally to these so as to prevent their relative movements in an axial direction, i.e. in a direction parallel to the axis of the gas turbine, during the functioning of the gas turbine.

In other words, each pin is orthogonal to a base surface of each of the two disks in which it is inserted, so as to prevent or in any case minimize the relative movements between the two disks in an axial direction, thus maintaining a seal with a nozzle-holder ring 70.

At the same time, each pin allows the disks to which it is constrained, to move in a radial direction so that the disks can freely adapt themselves to the thermal deformations without generating stress on the disks themselves.

This is possible as each pin, in the area in which it is constrained, is orthogonal to a base surface of each disk to which it is constrained, in particular it is orthogonal to a portion of the base surface around which it is constrained to the disks.

The reason for this is to avoid possible states of stress on the disks themselves which could jeopardize the correct functioning and useful life of the convex bottom 10.

Said series of disks are three convex disks and are respectively a first disk 12, a second disk 13 and a third disk 14.

Said three disks are arranged along the axis of the machine and have an outer circular shaped edge 15 which is engaged to obtain the axial seal, of the metal-on-metal type, on a corresponding annular surface 71 of an inner grooved surface 72 of said ring 70 coaxial with the axis of the turbine.

Each annular surface 71 is also orthogonal to the axis of the turbine.

Each disk of said three disks preferably comprises a series of housings 40 for said series of pins 20 and 21.

Said housings 40 are situated on each disk close to the outer circular shaped edge 15.

Said housings 40 are preferably bushings welded or brazed to each disk which are distributed at an equidistance along a circumference arranged on a base surface of each disk.

Said first disk 12 has a central opening 16 and said second disk 13 correspondingly has a central opening 17.

Said third disk 14 is situated between said first disk 12 and said second disk 13 and together with these, defines a first channel 61 and a second channel 62, respectively.

Said first channel 61 and said second channel 62 have the function of bringing air under pressure (purge air) downstream of the high pressure turbine and upstream of the low pressure turbine respectively, avoiding the ingestion of hot gases which could damage the components of the turbine.

Said bottom 10 comprises a series of spokes 30 welded to said three disks in corresponding central portions of each of these.

Each disk of said three disks comprises a series of pass-through cuts 18 situated on a base surface and arranged radially, equidistant and uniformly distributed along a circumference of said base surface.

Said series of spokes 30 are inserted in the corresponding series of cuts 18 of each disk of said three disks and made integral preferably by means of welding or brazing.

Said series of pins comprises a first series of pins 20 and a second series of pins 21, said first series of pins 20 constrains said first disk 12 to said third disk 14, whereas said second series of pins 21 constrains said second disk 13 to said third disk 14.

Furthermore, said first series of pins 20 is preferably angularly dephased with respect to second series of pins 21 by an angle preferably of 15°.

Said first series of pins 20 and said second series of pins 21 each preferably comprise twelve round-headed pins.

The first disk 12 and the second disk 13 consequently, each comprise 12 welded or brazed bushings, as housings for the first series of pins 20 and for the second series of pins 21, respectively.

The third disk 14 consequently comprises 24 welded or brazed bushings as housings for the first series of pins 20 and for the second series of pins 21, respectively.

By means of a series of round-headed pins arranged orthogonally to said disks, it is advantageously possible to allow the disks themselves to radially dilate without generating stress.

Said bottom 10, moreover, comprises an insulating element 80 applied on the first disk 12.

Said insulating element has a disk form having a central hole 81 for the passage of a stream of air fed through the opening 16.

By means of a bottom for a twin-shaft turbine according to the present invention, it is advantageously possible to have two ducts or channels for respective two streams of pressurized air (purge air), each of which is fed from outside the machine towards the low pressure turbine and towards the high pressure turbine respectively.

In this way, it is advantageously possible to avoid the ingestion of hot gases also coming from the high pressure turbine protecting the life of the components of the turbine and its reliability.

It can thus be seen that a convex sealing bottom for a twin-shaft turbine according to the present invention achieves the purposes specified above.

The convex sealing bottom for a twin-shaft turbine of the present invention thus conceived can undergo numerous modifications and variants, all included in the same inventive concept.

Furthermore, in practice, the materials used, as also the dimensions and components, can vary according to technical demands.

The invention claimed is:

1. A convex sealing bottom for a twin-shaft turbine comprising:
    a series of convex disks, constrained to each other by means of a series of pins, each disk of said series of disks comprises an outer shaped edge which is engaged with a corresponding annular surface of an inner grooved surface of a ring for obtaining an axial seal, wherein said series of disks comprise three disks, a first disk, a second disk and a third disk respectively, wherein said three disks are fixed to each other centrally by means of a series of spokes, the three disks being constrained in pairs respectively by means of said series of pins which are arranged orthogonally to said three disks to minimize the relative movements of said three disks in an axial direction at the same time allowing the radial dilatations of said three disks;
    wherein the series of pins comprise a first series of pins and a second series of pins with a round head, said first series of pins constrains said first disk to said third disk, whereas said second series of pins constrains said second disk to said third disk.

2. The convex sealing bottom according to claim 1, wherein each disk of said three disks comprises a series of housings for said series of pins.

3. The convex sealing bottom according to claim 1 or 2, wherein said series of housings is situated on each disk of said three disks along a circumference close to the outer circular shaped edge.

4. The convex sealing bottom according to claim 2, wherein said series of housings are bushings welded to each disk which are distributed at an equidistance along a circumference arranged on a base surface of each disk.

5. The convex sealing bottom according to claim 1, wherein said first disk has a central opening and said second disk correspondingly has a central opening.

6. The convex sealing bottom according to claim 1, wherein said third disk is situated between said first disk and said second disk and with these defines a first duct and a second duct respectively for respective two streams of pressurized air fed from outside the machine towards a high pressure turbine and towards a low pressure turbine respectively.

7. The convex sealing bottom according to claim 1, wherein each disk of said three disks comprises a series of pass-through cuts situated on a base surface and arranged radially, equidistant and uniformly distributed along a circumference of said base surface.

8. The convex sealing bottom according to claim 1, wherein said convex sealing bottom comprises a series of spokes inserted in a corresponding series of cuts of each disk of said three disks and welded to said three disks in corresponding central portions of each of these.

9. The convex sealing bottom according to claim 1, wherein the pins of said first series of pins and said second series of pins are distributed at a equidistance on a base circumference of each disk of said three disks.

10. The convex sealing bottom according to claim 9, wherein the pins of said first series of pins are angularly dephased with respect to said second series of pins by an angle of approximately 15°.

11. The convex sealing bottom according to claim 9, wherein said first series of pins and said second series of pins each comprise twelve round-headed pins.

12. The convex sealing bottom according to claim 9, wherein said first disk and said second disk each comprise twelve bushings respectively as housings for the first series of pins and for the second series of pins and in that said third disk comprises twenty-four bushings respectively as housings for said first series of pins and for said second series of pins.

13. The convex sealing bottom according to claim 1, further comprises an insulating element applied to said first disk.

* * * * *